No. 759,581. PATENTED MAY 10, 1904.
J. T. WILSON.
PACKING FOR PISTONS AND PISTON VALVES.
APPLICATION FILED NOV. 19, 1902.
NO MODEL.
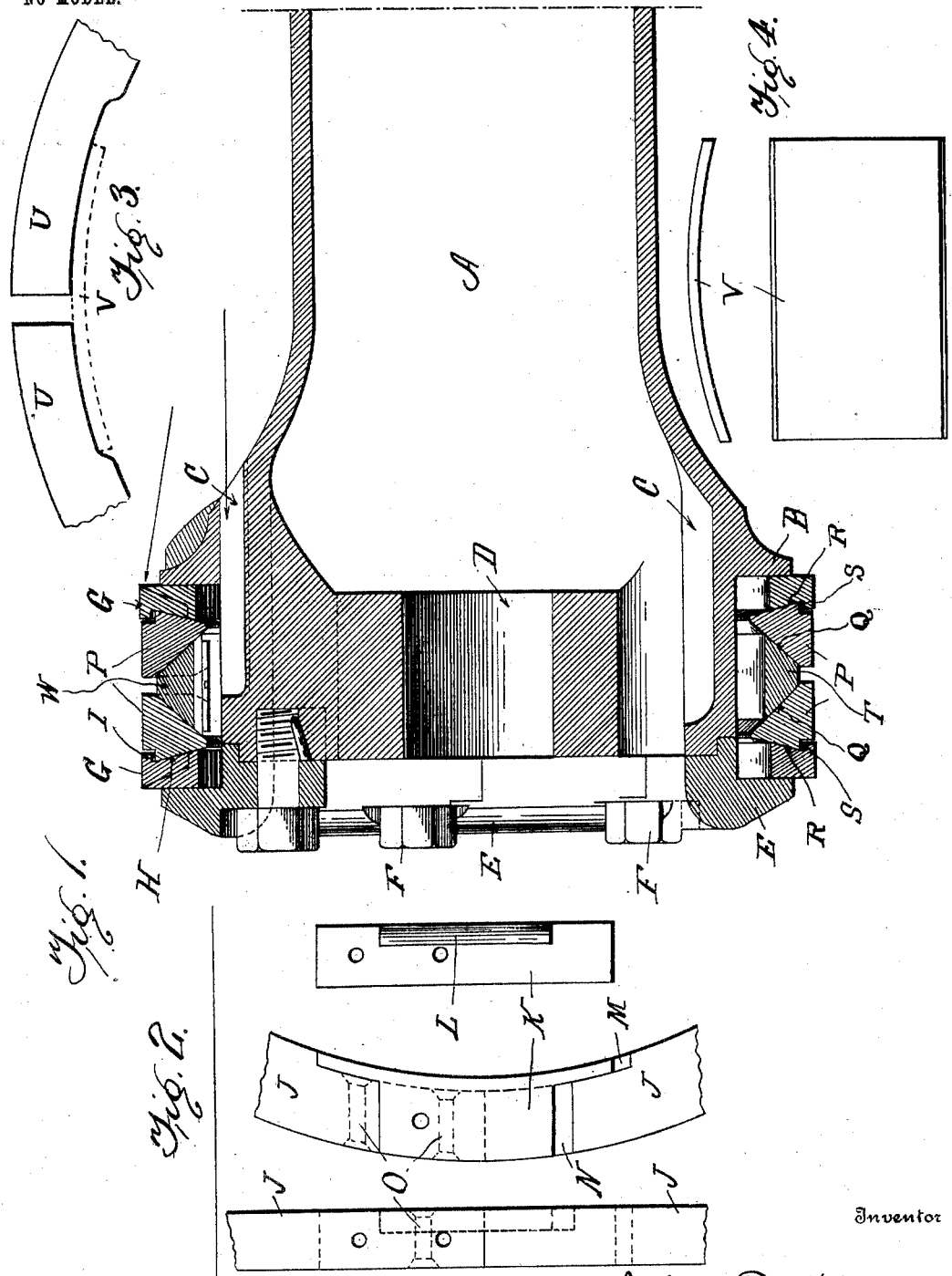

No. 759,581. Patented May 10, 1904.

UNITED STATES PATENT OFFICE.

JOHN T. WILSON, OF JERSEY SHORE, PENNSYLVANIA.

PACKING FOR PISTONS AND PISTON-VALVES.

SPECIFICATION forming part of Letters Patent No. 759,581, dated May 10, 1904.

Application filed November 19, 1902. Serial No. 131,938. (No model.)

*To all whom it may concern:*

Be it known that I, JOHN T. WILSON, a citizen of the United States, residing at Jersey Shore, in the county of Lycoming and State of Pennsylvania, have invented new and useful Improvements in Packing for Pistons and Piston-Valves, of which the following is a specification.

The object of my invention is the production of a packing for pistons, and especially for piston-valves, which shall not press excessively against the valve-chamber, which shall be adapted to contract under excessive port-pressure, which shall be so constructed that the packing-rings will be prevented from wearing laterally, which shall be controlled by motive-fluid pressure when the engine is working positively, which shall not become deranged or its efficiency be impaired by water working through the cylinder, and which withal shall constitute a superior means for performing the requisite functions.

My invention consists in certain novelties of construction and combinations of parts hereinafter set forth and claimed.

The accompanying drawings illustrate one example of the physical embodiment of my invention constructed according to the best mode I have so far devised for the practical application of the principle.

Figure 1 is a sectional view of one-half of a piston-valve, showing the packing in position. Fig. 2 illustrates the lap-joint of the snap or packing ring. Figs. 3 and 4 show the formation of the wedge-ring lap-joint.

Referring to the several figures, the letter A designates the valve-spool; B, a circumferential flange with a perpendicular wall; C, passages for water fluid; D, a hole for the valve-stem; E, a follower-plate with a flange which has a perpendicular wall; F, threaded studs for securing the follower-plate to the spool; G, snap or packing rings; H, the beveled surfaces of the snap-rings; I, flanges at the outer terminations of the beveled surfaces; J, the free meeting ends of the snap-ring; K, the joint-plate; L, a flange with a beveled surface; M, seats in the inner surfaces of the ends of the ring to receive the joint-plate; N, seats with beveled surfaces in the sides of the ends of the ring to receive the flange L of the plate; O, rivets which secure one end of the joint-plate to one end of the snap-ring; P, the wall-rings, each made integral and having beveled sides Q and R, as shown; S, recesses in the edges of the rings to receive the flanges I of the snap-rings; T, the wedge-ring with beveled sides; U, the free ends of the wedge-ring; V, the joint-plate with beveled edges, which plate fits seats formed in the under surfaces at the free ends of the wedge-ring, and W is one of the rivets which secures one end of the joint-plate to one end of the wedge-ring.

The operation of the packing in service is as follows: When motive fluid is admitted wherever the valve is used, it passes through the openings C to a position beneath the packing as a whole and acts simultaneously to expand the snap or packing and the wedge rings only. The wall-rings P being integral cannot expand. As the rings G expand so that their outer surfaces press against the surface of the valve-chamber the wedge-ring T, also expanding, moves the wall-rings against the snap-rings, the beveled surfaces R thereof engaging the beveled surfaces H of the snap-rings. It will be observed that the beveled surface H of the snap-ring inclines outwardly and is matched by the surface R of the wall-ring, which is beveled inwardly. The snap-ring consequently acts like a wedge, with its head facing toward the center of the ring. As the snap-ring is gripped between the wall of the spool or follower-plate and the wall-ring it is held with its outer surface in contact with the inner surface of the valve-chamber under a limited and substantially uniform pressure. Motive fluid acting upon its inner surface cannot excessively expand it, and normally the outward pressure of the motive fluid in the cylinder by way of the ports is balanced by the pressure upon the inner surface. However, where there is an excessive port-pressure of steam or water the snap-ring can contract and relieve the same. To restore the snap-ring to its normal position, the motive fluid must be shut off, as is obvious, and thereafter admitted. When the engine is drifting with motive fluid shut off, the wedge and snap rings are under contraction, so that the snap-rings do not press against the surface of the valve-chamber excessively, and consequently air under compression by the action of the piston can pass between the packing and the valve-chamber when it becomes excessive. The relative degrees of taper of the several rings must, of course, in any given case be determined by experiment, but in no instance should the arrangement be such that full pressure upon the wedge-ring will cause the excessive contraction of the snap-ring when motive fluid is acting upon its inner surface. The degree of taper upon the snap-ring should, however, be sufficient to overcome the action of the wedge-ring and allow the motive fluid to hold the former against the surface of the valve-chamber.

From the foregoing description, taken in connection with the drawings, it is clear that I have produced a packing for a piston or piston-valve which fulfils all the conditions set forth as the object of my invention.

In practice the shape and form of the several elements comprising the packing may obviously be changed and the invention embodied by other modes and in other examples, and one wedge-ring, one wall-ring without constituting substantial departures.

What I claim as new, and desire to secure by Letters Patent, is—

1. A packing for a piston or piston-valve having two snap-rings, two wall-rings, and a wedge-ring having a beveled surface; all the rings being so disposed as to receive fluid under pressure.

2. A packing for a piston or piston-valve having two snap-rings, two wall-rings, and a wedge-ring with two beveled surfaces; motive fluid being admitted to the inner surfaces of all the said rings.

3. A packing for a piston or piston-valve having two snap-rings, two integral wall-rings, and a wedge-ring with a beveled surface; all the rings being subjected to fluid-pressure.

4. A packing for a piston or piston-valve having two snap-rings, two integral wall-rings, and a wedge-ring with two beveled surfaces; motive fluid being admitted to the inner surfaces of all the rings.

5. A packing for a piston or piston-valve having two snap-rings each with a beveled surface, two wall-rings with beveled sides; and a wedge-ring engaging the wall-rings.

6. A packing for a piston or piston-valve having five rings, three of them being expansible and two non-expansible; all of said expansible rings being open or exposed to fluid under pressure.

7. A packing for a piston or piston-valve having five rings, two of them being non-expansible and three expansible, and one of said expansible rings being a wedge-ring, all the rings being subjected to fluid-pressure.

8. A packing for a piston or piston-valve having two non-expansible rings, and three expansible rings; each of said rings having a beveled side, and one of said expansible rings being exposed to fluid under pressure.

9. A packing for a piston or piston-valve having an expansible wedge-ring, two non-expansible rings, and two expansible snap-rings; each of said expansible or snap rings having one side beveled, and each of said non-expansible rings having two sides beveled.

In testimony whereof I affix my signature in presence of two witnesses.

JOHN T. WILSON.

Witnesses:
  ROBT. A. SEBRING,
  WM. R. PEOPLES.